J. F. FRAZEE.
INDICATOR FOR VEHICLES.
APPLICATION FILED APR. 19, 1915.
1,157,157.
Patented Oct. 19, 1915.
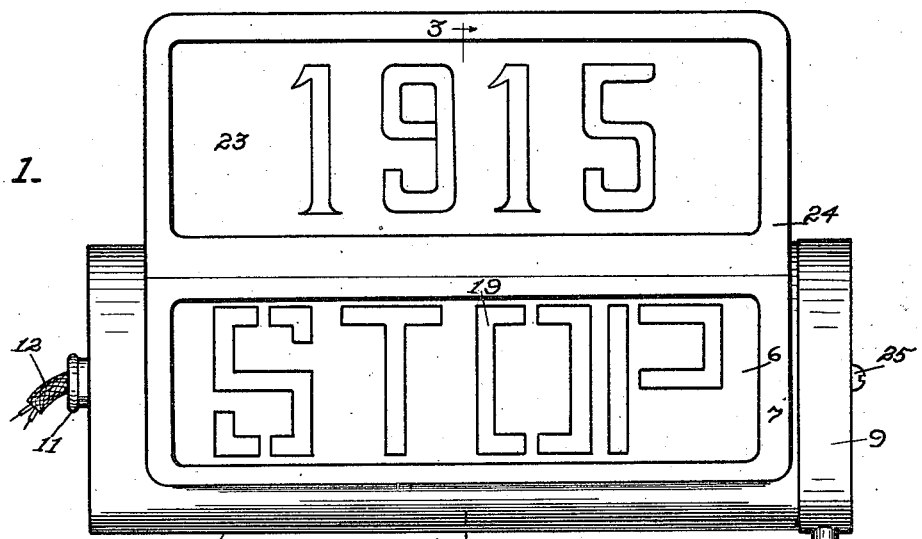
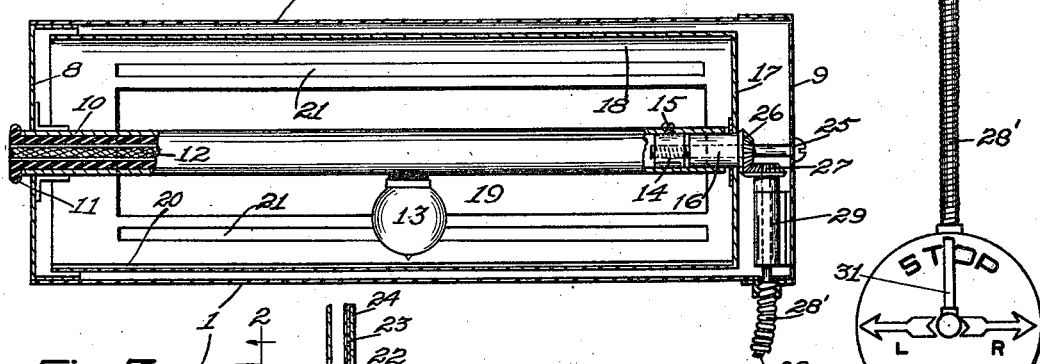
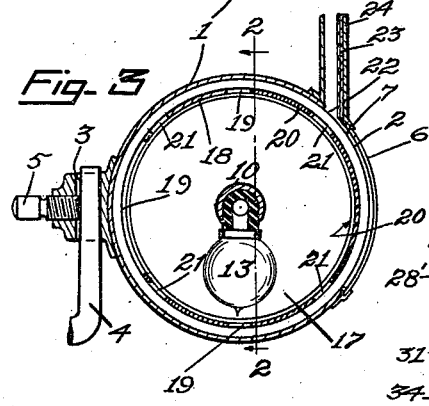
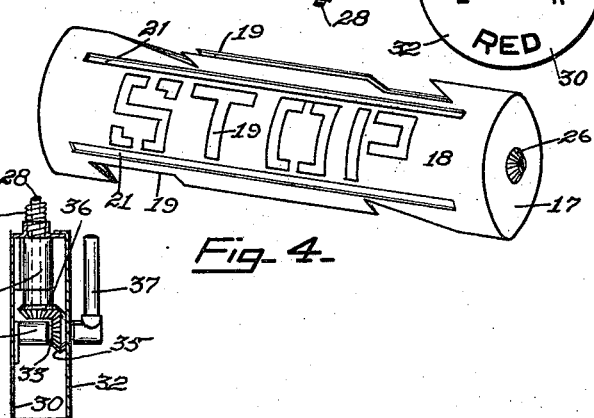
WITNESS
Wm. F. Drew.
INVENTOR
Jackson F. Frazee
BY
Acker & Totter
ATTORNEYS

UNITED STATES PATENT OFFICE.

JACKSON F. FRAZEE, OF SAN FRANCISCO, CALIFORNIA, ASSIGNOR OF ONE-HALF TO HANS CARL NEILSEN, OF SAN FRANCISCO, CALIFORNIA.

INDICATOR FOR VEHICLES.

1,157,157.          Specification of Letters Patent.         Patented Oct. 19, 1915.

Application filed April 19, 1915. Serial No. 22,258.

*To all whom it may concern:*

Be it known that I, JACKSON F. FRAZEE, a citizen of the United States, residing in the city and county of San Francisco and State of California, have invented certain new and useful Improvements in Indicators for Vehicles, of which the following is a specification.

The present invention relates to vehicle signals, and particularly to a type of signal adapted for positioning on the rear of a vehicle and to be operated by the vehicle driver to apprise drivers of following vehicles of the course of the vehicle to which the signal is attached.

The invention has for its objects, to provide a signal which is capable of being actuated by the vehicle operator, one which is equally as well adapted for use at night as in the day, one provided with means for attachment to the rear lamp bracket of the vehicle, and which contains the commonly termed red tail light, thereby dispensing with the lamp now carried on the rear of all motor vehicles, and one which is simple in construction, is capable of being manually actuated by the vehicle operator, and is adapted to be constructed at little cost.

With the above mentioned and other objects in view, the invention consists in the novel construction and combination of parts hereinafter described, illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in elevation of an embodiment of my invention, disclosing the casing and the rotating cylinder contained therein, the operating mechanism to extend to the driver's seat and the license plate at the top of the casing. Fig. 2 is a longitudinal sectional view taken on line 2—2 of Fig. 3, disclosing the casing, the rotating cylinder therein, the illuminating means, and the rotating means for the cylinder. Fig. 3 is a transverse sectional view taken on line 3—3 of Fig. 2. Fig. 4 is a view in perspective of the cylinder removed from the casing. Fig. 5 is a sectional view of the controlling means positioned at the driver's seat.

Referring more particularly to the drawings, wherein like characters of reference designate corresponding parts throughout the several views—1 is a suitable tubular casing formed with a longitudinal opening 2 and preferably provided with a socket 3 for the reception of the end of a supporting bracket 4 which is retained in the socket by the set screw 5. Suitable transparent material 6 is adapted to cover the opening 2 and the same is received at its edges in guides 7 surrounding the opening.

The ends of the casing are adapted to be closed by the removable end members 8 and 9 which frictionally engage the ends of the casing, and the member 8 is provided centrally with a tubular supporting member 10 open at its ends and which extends longitudinally centrally with the casing, as in Fig. 2. An insulating tube 11 is positioned within the supporting member 10 and extends for a portion of the length thereof, and at one end opens exteriorly of the member 8 and at its opposite end extends through an opening in the member 10 which carries a lamp socket in rear of the opening 2. Suitable electrical connections 12 extend through the tube 11 and supply power from any suitable source to a lamp 13.

A slight distance within the free end of the supporting member 10 is positioned a threaded bushing 14 held stationary by a set screw 15 and rotatably mounted in the end of said support is a tubular stub shaft 16 which extends through the end 17 of a tubular shell 18 of substantially the same length and diameter as the casing 1. The shell is formed on its surface with suitable cut out portions 19 which are adapted for registering with the opening 2 and are indicative of the direction of travel or turning of the vehicle, namely, the word stop, two arrows, one pointing in each direction horizontally which indicate the direction of turn the vehicle is to make, and one open space denoting that the vehicle driver intends to continue the vehicle in the direction it is now traveling. Within the tubular shell is adapted to be positioned a sheet of opaque material 20 which lies against the inner surface of the shell, and the portions in rear of each of the cut out portions 19 are adapted to be colored differently.

The shell is provided on each side of the cut out portions 20 with longitudinal slots 21, one of which, when one of the cut out portions 19 registers with the opening 2, is in register with a slot 22 formed in the casing above the cut out 2, and at one side of which is preferably positioned a license plate 23 carried by a bracket 24. A screw 25 extends through the end member 9 through the stub shaft 16 and into the bushing 14 and retains the shell in position to rotate about the supporting member 10.

The shell is rotated in the casing by the following mechanism: On the outer end of the stub shaft 16 is formed a gear 26 which intermeshes with a suitable beveled gear 27 carried on the end of a flexible shaft 28 which extends through a bearing 29 carried by the member 9. The shaft 28 extends through an opening in the side of the end member 9 into a casing 30 and through a bearing 31 therein. The casing 30 is preferably positioned on the vehicle adjacent to the driver and has a removable cover 32 provided with indications corresponding to those formed by the cut out portions 19 on the shell. Mounted on a shaft 33 extending through the cover and into a bearing 34 is a beveled gear 35 which intermeshes with a corresponding gear 36 on the shaft 28. An operating handle 37 is carried by the shaft 33 and the same provides a means to register with the indications on the cover to designate which of the cut outs 19 of the shell is in register with the opening 2 in the casing 1. A flexible protecting tube or casing 28' surrounds the shaft 28 for its full length and is detachably secured at opposite ends in the casing 1 and 30.

It will be observed that a one-quarter turn of the handle 37 relative to the cover 32, and from one indication to another will through the operating means cause the shell to rotate a one-quarter turn with the casing and present a new indication to the opening in the casing. The course of the vehicle will be readily indicated during the day, and at night the illumination within the shell will cause the different indications in the shell to be presented in different colors as they register with the opening in the casing and will cause the license number to be illuminated.

Having thus described my invention what I claim is:—

1. An indicator for vehicles comprising an open ended tubular casing having an aperture in its side wall, removable end members for closing the ends of said casing, a tubular supporting shaft carried by one of said end members, a tubular shell rotatably mounted in said casing and formed at its surface with apertures adapted on the rotation thereof to register with the aperture of the casing, a tubular stub shaft carried by the closed end of said shell for reception in one end of said end tubular supporting shaft, a gear on one end of said stub shaft, a coöperating gear carried by one of the end members, means for operating said last mentioned gear, and means for threading into said supporting shaft and extended through said stub shaft and one end of said member for maintaining the said gears in operative relation.

2. An indicator for vehicles comprising an open ended tubular casing having apertures in its side wall, end members for closing the ends of said casing, a tubular supporting shaft carried by one of said end members and extending into said casing, a threaded bushing carried by the free end of said shaft, a tubular shell rotatably mounted in said casing, said shell being open at one end and inclosing said shaft, and formed on its surface with apertures adapted on the rotation thereof to register with the apertures in the casing; a tubular stub shaft carried by said closed end of said shell, for reception in the open end of said supporting shaft, a gear carried by the outer end of said stub shaft, and operating means carried by the other end of said members and coöperating with said gear, and a securing means extending through said last mentioned member and through said tubular stub shaft into said threaded bushing for securing said members in place.

In testimony whereof I have signed my name to this specification in the presence of two subscribing witnesses.

JACKSON F. FRAZEE.

Witnesses:
 HARRY A. TOTTEN,
 D. B. RICHARDS.